United States Patent [19]

Ripka et al.

[11] Patent Number: 4,738,394
[45] Date of Patent: Apr. 19, 1988

[54] INTEGRAL LIQUID-BACKED GAS-FIRED SPACE HEATING AND HOT WATER SYSTEM

[75] Inventors: Chester D. Ripka, E. Syracuse; Jay L. Boot, Manlius; Ian M. Shapiro, Fayetteville, all of N.Y.

[73] Assignee: Carrier Corporation, Syracuse, N.Y.

[21] Appl. No.: 17,309

[22] Filed: Feb. 20, 1987

[51] Int. Cl.[4] ................................. F24D 3/08
[52] U.S. Cl. ................................. 236/20 R; 237/19; 236/25 R
[58] Field of Search .................. 237/19, 8 R, 56; 126/362; 236/20 R; 122/20 B, 17

[56] References Cited

U.S. PATENT DOCUMENTS 4,403,572 9/1983 Gerstmann et al. ............ 122/20 B
4,484,564 11/1984 Erickson ........................ 122/20 B

FOREIGN PATENT DOCUMENTS 2906555 10/1980 Fed. Rep. of Germany ........ 237/19
2465958 4/1981 France ........................... 237/19

Primary Examiner—Henry A. Bennet
Attorney, Agent, or Firm—Robert H. Kelly

[57] ABSTRACT

Domestic tankless water heating is incorporated into a space heating system. The space heating system includes a fluid flow loop with a fluid pump for circulating the fluid in the loop and a remote fan coil for transferring heat to the air in the space to be heated. The heat source is an infrared burner and the heating of the domestic water may be either directly by the burner through radiative and convective heat exchange in an open loop system or by heat exchange in a tube-in-tube heat exchanger which is in series with the fan coil in a closed loop system.

3 Claims, 3 Drawing Sheets

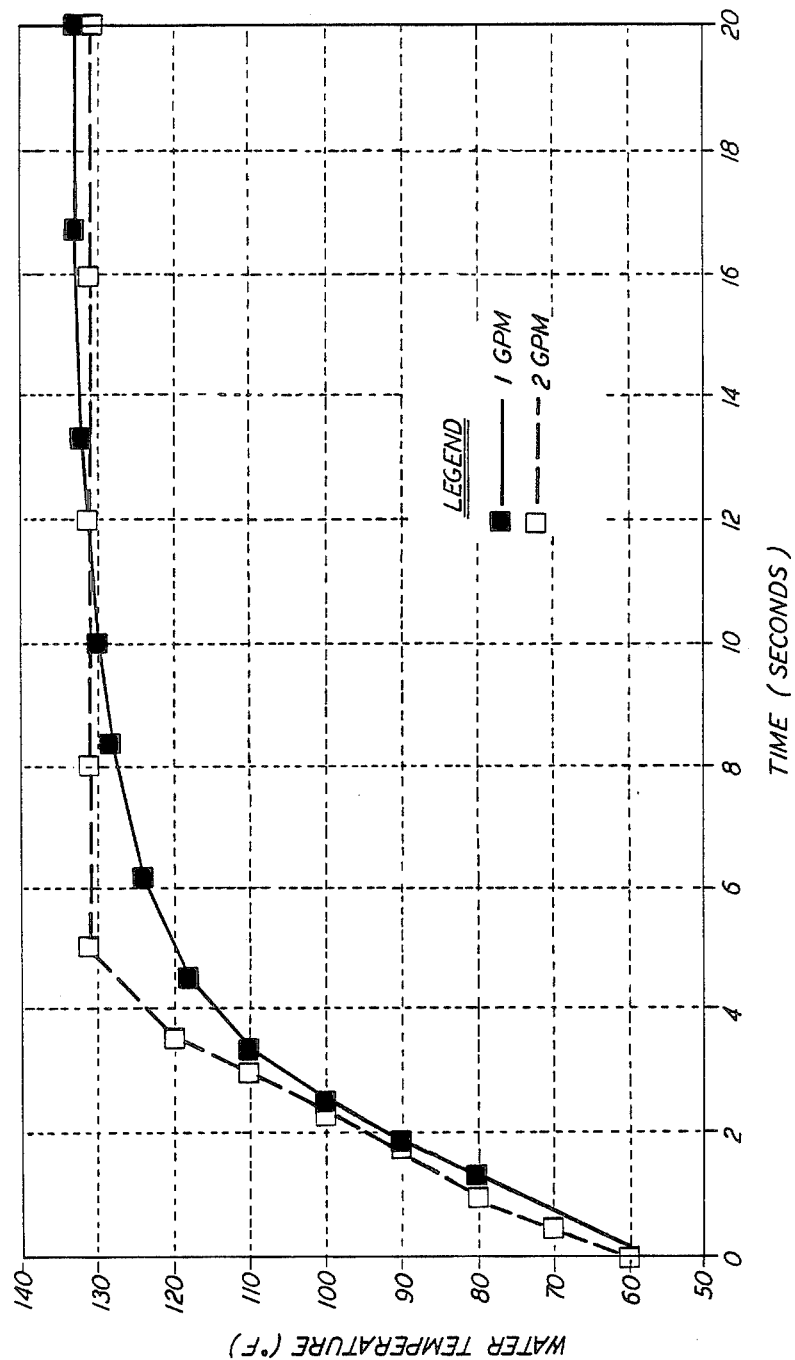

INTEGRAL LIQUID-BACKED GAS-FIRED SPACE HEATING AND HOT WATER SYSTEM

BACKGROUND OF THE INVENTION

This invention relates generally to a fluid heating system and, more particularly, to a heating system which utilizes an infrared burner module having a heat exchanger coil wrapped around a radiant burner to provide both domestic hot water and space heat.

In heating systems for homes and commercial buildings, central furnaces to heat a space all operate on the same general principle. Air for a space to be heated circulates through a closed system (such as ductwork), and is heated either as it passes through a heat exchanger in contact with a burning fuel, or as it passes in contact with a secondary fluid which has been heated by a burning fuel. Since burning the fuel results in the production of noxious combustion gases having exhaust temperatures which can exceed 500° F., it is necessary to exhaust the combustion gases through a chimney or flue to the atmosphere. These systems are relatively inefficient due to the high exhaust temperatures of the flue gases, and costly due to the construction of the necessary flue or chimney.

Indirect fired furnaces, ones in which the air being heated is not contacted directly by the combustion gases generated, are generally used in both forced air systems and hydronic systems.

A forced air system consists primarily of a heat exchanger having combustion chambers arranged in relation to the flow of air to be heated such that fuel is generally introduced at the lower end of the chamber where a flame causes heat to be generated. The heat rises through a series of internal baffles before exiting through an upper end of the combustion chamber into the flue or chimney. Simultaneously, circulated space air passes around the outside of the heat exchangers to absorb heat through conduction and convection.

A hydronic system consists primarily of a firebox having a heat exchanger therein. The heat exchanger is located in a closed loop system for continuously circulating water from the heat exchanger to a remote radiator in the space to be heated. However, this system is also relatively inefficient and expensive due to the combustion gas temperatures at the outlet of the firebox and the cost of the chimney.

In supplying domestic hot water for homes and commercial buildings, potable hot water systems with ordinary glass-lined, hot water storage tanks are generally used. It is common for these systems to have an enclosed water tank in which the cold water to be heated enters. At the lowermost portion of the tank there is normally a burner whose heat is allowed to pass through the tank, thereby heating the water in the tank for use within the home or building. Again, as in the space heating systems for homes and buildings, the heat which is not transferred to the heat exchanger is exhausted at the top of the tank into a flue or chimney to the atmosphere. Thus, a domestic hot water system is also inefficient because a great portion of the heat is lost directly up the chimney to the atmosphere, both during demand/on time and standby/off time, as well as being lost through the tank jacket. In addition to the inefficiencies of these systems, the flues or chimneys are costly to construct.

Because of the rising costs of energy, the incentives to conserve energy are increasing. Consequently, there is currently considerable interest in recovering energy, such as waste heat from combustion heaters which is usually injected into the atmosphere without recovery, and eliminating energy waste by making furnaces and water heaters more efficient.

In an attempt to increase the efficiency of a heating system condensing furnaces were implemented. In condensing furnaces exhaust combustion gases are used to preheat the space air prior to this air contacting the primary heat exchanger. Thus, in this type of furnace exhaust temperatures are reduced but corrosive condensates are formed as the exhaust combustion gases are reduced below their dew point.

In an attempt to reclaim rejected heat, heat exchange coils have been installed in the flue of a furnace to transfer some of the waste heat to domestic hot water heaters, thus recovering some usually wasted heat.

However, the increase in efficiency of known heating systems has not reduced the large size of the furnace. The large furnace structure is the result of the need for large heat exchange surface areas to transfer the convection heat from the combustion products to the space air or hydronic fluid. Moreover, the recovery of waste heat has not reduced the size of a water heater but in fact has increased its size. Prior art for a central installation requires a large separate furnace to heat the space and a tank type water heater to supply potable hot water.

Another problem in space heating installations and domestic hot water tanks is the loud low frequency noise associated with these systems commonly called combustion roar. This is especially true where the furnace is connected to a duct of the heating system which tends to amplify the noise.

Still another problem in previously known combustion systems is that furnaces or water heaters normally generate gaseous combustion products which include oxides of nitrogen ($NO_x$) which are vented to the atmosphere as flue gases. It is desirable to limit these oxides of nitrogen emissions since oxides of nitrogen are considered pollutants, and gas-fired combustion systems sold in certain geographical areas must meet strict $NO_x$ emission standards.

Thus, there is a clear need for an integral space heating/hot water gas-fired system having a modular design that will, to a large extent, overcome the problems noted in the prior art.

SUMMARY OF THE INVENTION

It is an object of the present invention to provide a quiet, compact, and efficient heating system that effectively combines space heating with domestic tankless water heating.

It is another object of the present invention to provide an integrated heating system having a liquid-backed gas-fired heating module which will provide instantaneous and continuous domestic hot water, without a storage tank, while providing space heating capacity for a radiator or fan coil unit.

A further object of the present invention is to provide a single package heater having a sealed combustion module with a radiant burner which will produce low $NO_x$ emissions and provides through the wall air intake and discharge of combustion products, thereby eliminating a chimney.

These and other objects of the present invention are attained by providing a heating system for heating a space having a closed fluid flow loop with a fluid pump for circulating the fluid in the loop and a remote fan coil for transferring heat to the air in the space to be heated, and a tube-in-tube heat exchanger to transfer heat from the closed loop to the domestic water to provide instantaneous and continuous hot water, and a liquid-backed heating module having an infrared burner and a heat exchanger coil wrapped around the burner, and a tube-in-tube heat exchanger for purposes of heating domestic hot water.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the accompanying drawings forming a part of the specification, and in which reference shown in the drawings designate like or corresponding parts throughout the same.

FIG. 3 is a graph of the transient temperature response to call for hot water as a function of time of the present invention.

DESCRIPTION OF THE PREFERRED EMBODIMENTS

Figure 1:
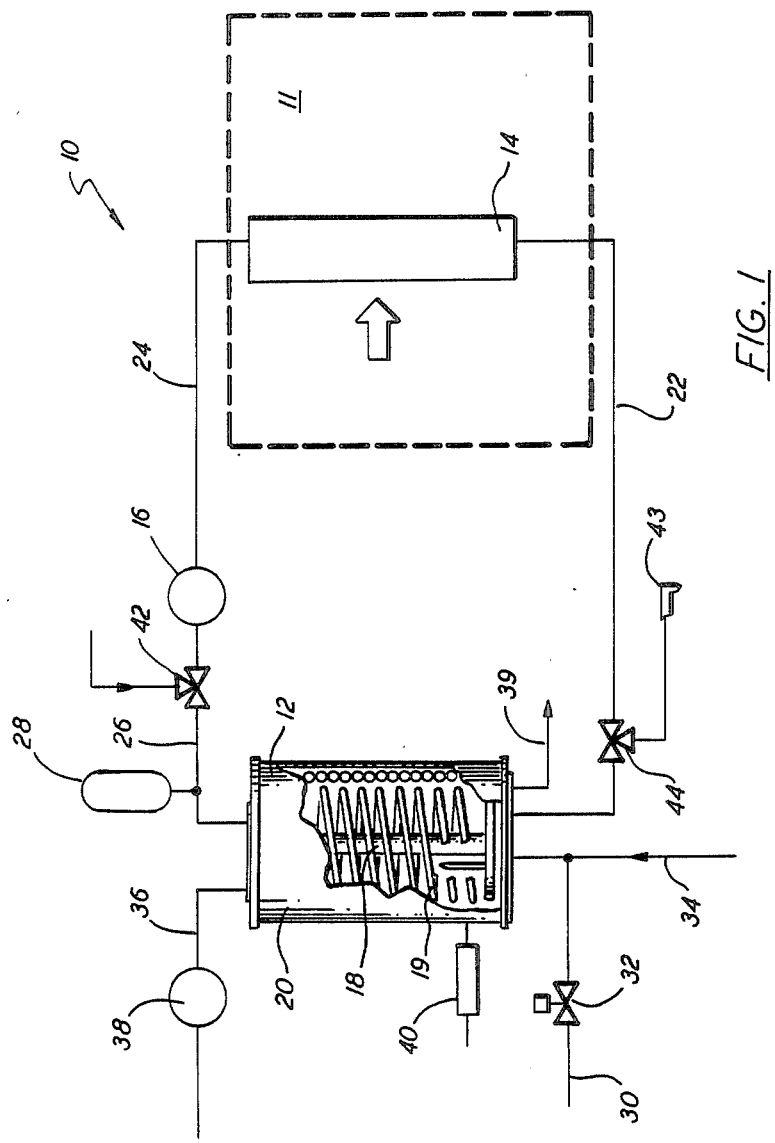
FIG. 1 is a schematic diagram of the hydronic heating system of the present invention with direct heating of potable water.

Referring now to FIG. 1 there may be seen a schematic view of a residential heating system 10 using a liquid-backed heating module 12 for supplying energy to the system. The heating system 10 includes heating module 12, remote radiator or fan coil 14, and a liquid pump 16. The remote fan coil 14 may typically be a plate fin heat exchanger or a radiator having air flowing therethrough in the direction of the arrow into the space 11 to be heated. Radiators are generally used in hydronic systems in which the air in the space to be heated is circulated by gravity. In a conventional forced air system air is drawn from the room through cold air ducts and, after passing around the heat exchanger in the furnace, is discharged through hot air ducts. Normally, a fan is incorporated in the furnace to provide forced circulation of the air between the furnace and the rooms or other space to be heated. In the present invention the fan coil 14 is connected to the discharge of the heating module 12 by a pipe section 22. The fluid in the heating system circulates from the fan coil 14 through pipe section 24 to liquid pump 16 and then under the pressure of the liquid pump 16 is returned to the heating module 12 through pipe section 26. An expansion tank 28 is connected to pipe section 26 to provide volume for the expansion of the heated liquid and to dampen any pressure surges in the heating system. As illustrated, the heating module 12 includes a gas line 30 having a regulator 32 for supplying fuel to the module. Further, air is supplied to the module through line 34. The air/fuel mixture is ignited by ignition device 40 and is burned on the infrared burner, described hereinafter, and the flue gases are discharged from the module through flue pipe 36 by induction fan 38 while any condensate formed is collected and drained through drain 39. If, however, combustion efficiency or pressure drop linearity problems exist, a forced draft fan may be used upstream of the module. Burner control 40 is a conventional furnace control and will not be described in detail herein. In a conventional control, a spark ignition system is used to ignite the air/fuel mixture and a flame sensor is used to sense whether combustion actually occurs. The control system, for example, may be a Honeywell Model S87D Direct Spark Ignition System. Still further as shown in FIG. 1, domestic water enters the system through three-way valve 42, is heated in the heating module 12 and is returned to the domestic hot water system represented by tap 43 through three-way valve 44.

As further shown in FIG. 1, the heating module 12, comprises a housing 20 with an infrared burner 18 located centrally therein. Air is supplied through air line 34 and fuel is supplied through regulator 32 and gas line 30 such that the air and gaseous fuel are 100% premixed, thus, no secondary combustion occurs. A heat exchange means 19 is located in spaced relation to the infrared burner 18 to receive heat from the infrared burner. The heat exchange means in the form of a helical coil has fluid, e.g. potable water, flowing therethrough which absorbs heat from the infrared burner 18 and transfers this heat to the fluid in the coil which flows through three-way valve 44 and/or flows to faucet 43 or to the space 11 to be conditioned by way of the remote fan coil 14. The heat exchange means 19 may preferably be a plurality of helical coils forming passageways for the combustion gases. Moreover, the heat exchange means 19 is heated by both radiation and convection heat transfer from the infrared burner 18. If the adjacent coils of a plurality of helical coils are closely spaced to form a plurality of walls, then, the combustion gases will flow along the inner wall of the inner coil and then between the inner and middle coil walls and between the outer coil wall and the middle coil wall to be discharged by the induction fan 38 to atmosphere.

Figure 2:
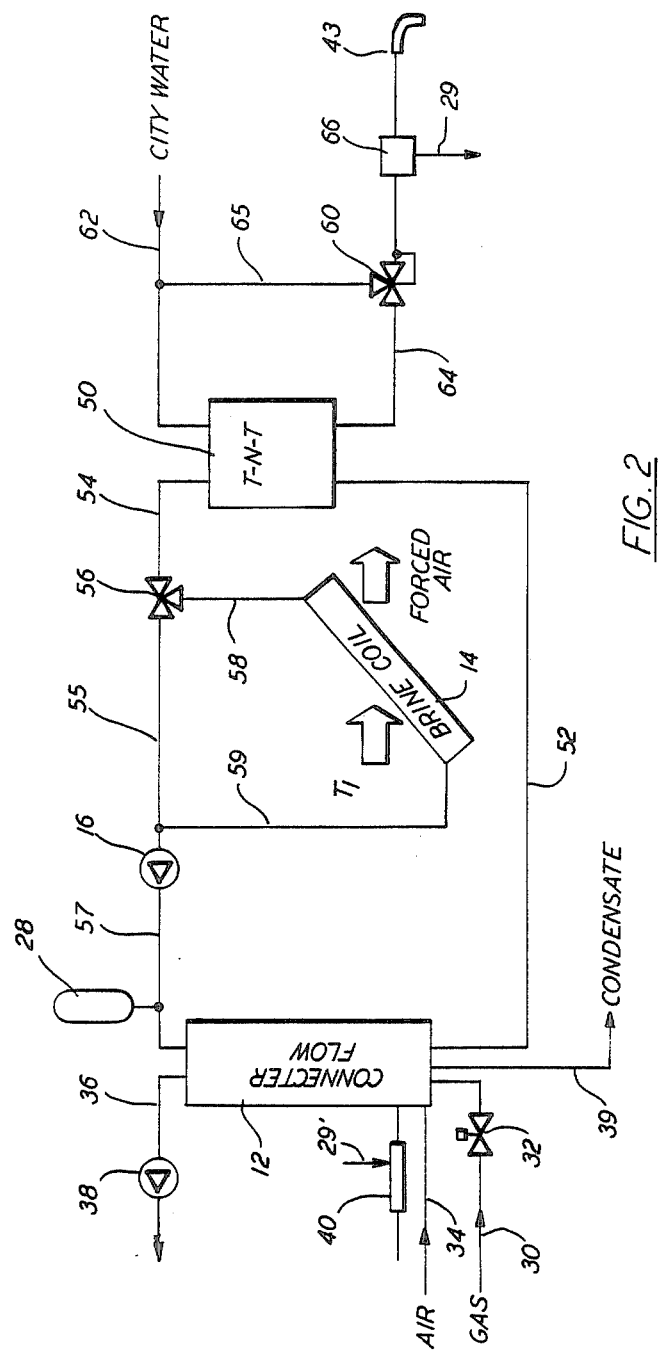
FIG. 2 is a schematic diagram of the hydronic heating system of the present invention with indirect heating of potable water.

Referring now to FIG. 2 there is shown an embodiment of a closed loop heating fluid system of the present invention using the same heating module 12 as hereinabove described, but using a series fluid loop for space heating and domestic hot water. This fluid loop arrangement as shown consists of discharge pipe 52 which extracts hot fluid from heating module 12 on demand. The heated fluid flows through a tube-in-tube heat exchanger 50 of conventional construction. The fluid then flows through pipe 54 and through three-way valve 56. In a first position the three-way valve 56 allows the fluid to flow directly to the liquid pump 16 through pipe 55 and back to the heating module 12 through pipe 57. In a second position the three-way valve 56 allows the fluid in the loop to flow through pipe 58 into fan coil 14 and through pipe 59 back to the suction of liquid pump 16.

Further, as shown in FIG. 2, domestic hot water loop includes cold water inlet pipe 62 connected to the inlet of tube-in-tube heat exchanger 50 and outlet pipe 64 which discharges hot domestic water to tap 43 after passing through flow switch 66.

The flow switch senses water flow through the tap and sends an electrical signal through conductor 29 to a microprocessor control, not illustrated, which in response thereto sends a signal via conductor 29' to energize the ignition device 40 and circulating pump 16.

A mixing valve 60 connects pipe 64 to bypass pipe 65. Mixing valve 60 is preferably a temperature responsive valve which mixes the hot water flowing through the heat exchanger 50 and the cold water flowing through the bypass pipe 65 to ensure that the hot water flowing from the tap 43 is at a desired temperature such as 120° F. The mixing valve 60 may be, for example, a Tour-Anderson mixing valve.

The relative sizes and dimensions of the components of the system so far described depend on the application to which the unit is put. However, for a typical residential heating and domestic hot water system, the heating module may advantageously have a heating capacity of 108,000 BTU/Hour. The closed loop fluid system, including tube-in-tube heat exchanger 50, fan coil 14, connecting pipes, and helical coil 19 advantageously has a capacity of three gallons of fluid per minute at about 190° F. for each 122,000 BTU/Hour heat input to the infrared burner.

Accordingly, FIG. 3 exemplifies the heat transfer performance of the tube-in-tube heat exchanger for various hot water flows through tap 43. Curve 70 indicates the water temperature rise with respect to time for a 1 GPM flow through tap 43, while curve 70' indicates the temperature per time for a 2 GPM flow.

In operation and referring to FIG. 2, the fluid flow loop can supply the exact domestic hot water on demand with the remaining heat, if required, being supplied to the fan coil 14, which is in series but downstream of the tube-in-tube heat exchanger. Thus, with the tap 43 open, flow switch 66 senses flow and sends a signal to initiate heating module 14 operation through ignition device 40, and fluid loop operation through liquid pump 16. Once heating module 12 is energized hot fluid flows through tube-in-tube heat exchanger to satisfy the domestic hot water demand. If at the same time space heating is required, as sensed by a conventional room thermostat, then two-way valve 56 is positioned to a second position which allows the fluid also to flow through fan coil 14 to satisfy the need for space heat. If the demand for space heat is satisfied while the tap 43 is still open, then the two-way valve 56 changes to a first position and the hot fluid bypasses the fan coil 14. Moreover, if the demand at tap 43 is decreased, such as by opening the tap only slightly, then mixing valve 60 allows cold water to flow through pipe 65 to ensure the hot water at the tap is at the desired temperature. Furthermore, if demand for hot water at tap 43 is high, coil 14 may also again be bypassed in order to prevent lower temperature, less comfortable air in the space to be heated.

While the preferred embodiments of the present invention have been depicted and described, it will be appreciated by those skilled in the art that many modifications, substitutions, and changes may be made thereto without departing from the true spirit and scope of the invention. For example, although the invention has been described in terms of use with a single fan coil, it may also be used with multi-fan coils.

What is claimed is:

1. An integral heating system for heating a space and a tankless domestic hot water circuit, comprising:
   a liquid backed burner means for heating a fluid, said burner means having a tubing coil surrounding a radiant burner whereby the radiant burner supplies heat to the fluid flowing through said tubing coil;
   means for supplying the fluid from said liquid backed burner means to a flow loop, said flow loop including a first, second, and third flow path, said second flow path and said third flow path defining parallel flow paths, and said second flow path including a coil for supplying heat to a space, and said first flow path in series with said second and third flow paths for supplying heat for the tankless domestic hot water circuit;
   valve means for diverting the fluid between said second flow path and said third flow path; and
   sensing means for sensing the temperature of the fluid in the first flow path, said sensing means controlling the operation of said valve means to maintain the temperature through the first flow path at a predetermined value.

2. An integral heating system as set forth in claim 1 wherein said first flow path includes a tube-in-tube heat exchanger for heating domestic hot water in a secondary loop and said sensing means controls the energy supply for hot water in the secondary loop by directing said fluid through said valve means and either said second flow path or said third flow path to satisfy the needs of said first flow path.

3. A tankless heating system as set forth in claim 2 further comprising a mixing valve means in said secondary loop for supplying unheated domestic water to the heated domestic water at an outlet of said first coil to maintain the domestic hot water at a predetermined temperature.

* * * * *